United States Patent [19]

Izumi et al.

[11] 4,451,893

[45] May 29, 1984

[54] CONTROL METHOD AND CONTROL SYSTEM FOR HYDROSTATIC DRIVE SYSTEM

[75] Inventors: Eiki Izumi; Hiroshi Watanabe; Yukio Aoyagi; Kazuo Honma; Kichio Nakajima, all of Ibaraki, Japan

[73] Assignee: Hitachi Construction Machinery Co., Ltd., Tokyo, Japan

[21] Appl. No.: 311,969

[22] Filed: Oct. 16, 1981

[30] Foreign Application Priority Data

Oct. 17, 1980 [JP] Japan .................... 55-144280

[51] Int. Cl.³ .............................................. G06F 15/46
[52] U.S. Cl. .............................. 364/494; 364/431.02; 417/19; 417/20
[58] Field of Search ............... 364/172, 148, 492, 494, 364/431.01, 431.02, 509, 510, 558; 417/19, 20, 43; 415/17

[56] References Cited

U.S. PATENT DOCUMENTS

| | | | |
|---|---|---|---|
| 3,994,623 | 11/1976 | Rutshtein et al. | 417/19 |
| 4,108,574 | 8/1978 | Bartley et al. | 417/19 |
| 4,164,035 | 8/1979 | Glennon et al. | 415/17 X |
| 4,218,191 | 8/1980 | Stewart | 417/20 X |
| 4,227,862 | 10/1980 | Andrew et al. | 417/19 X |

Primary Examiner—Joseph F. Ruggiero
Attorney, Agent, or Firm—Antonelli, Terry & Wands

[57] ABSTRACT

A control method and a control system for a hydrostatic drive system including a variable displacement hydraulic pump and a hydraulic actuator connected together to form a closed hydraulic fluid circuit. When the flow rate of the hydraulic pump is increased, the rate of change in the tilt of the hydraulic pump is controlled so that the discharge pressure does not exceed a first set of preset values with respect to the flow rate of the pump, meanwhile when the flow rate of the pump is reduced, the rate of change in the tilt of the hydraulic pump is controlled so that the suction pressure does not exceed a second set of preset values with respect to the flow rate of the pump.

10 Claims, 9 Drawing Figures

CONTROL METHOD AND CONTROL SYSTEM FOR HYDROSTATIC DRIVE SYSTEM

BACKGROUND OF THE INVENTION

This invention relates to a control method and a control system for a hydrostatic drive system comprising a variable displacement hydraulic pump driven by a prime mover and a hydraulic actuator connected to the pump to provide a closed hydraulic fluid circuit.

A hydrostatic drive system for use with a bulldozer, hydraulic shovel, hydraulic crane and other hydraulically operated machine is known, with the drive system comprising a variable displacement hydraulic pump driven by a prime mover and a hydraulic actuator for driving a load connected to the pump to provide a closed circuit. A typical variable displacement hydraulic pump used for this purpose is an axial type or a radial type piston pump which includes a movable member, such as a swash plate or a swash shaft, operative to determine a displacement or a piston stroke depending on its own position. In this type of hydrostatic drive system, the load is driven and its operation is interrupted by moving the movable member to increase or decrease the flow rate of the hydraulic pump after the pump has been driven for rotation at constant velocity by the prime mover. With a high inertia load, driven or having its operation interrupted, the pressure on the discharge side of the pump or the suction side thereof may show an inordinate rise, in proportion to the rate of change in the flow rate of the pump. Generally, to avoid this phenomenon, proposals have been made to mount a relief valve in the circuit on the discharge side and in the circuit on the suction side. However, actuation of the relief valve is not desirable, for it means a loss of power or energy because hydraulic fluid of high pressure bypasses the actuator or pump.

To avoid this loss of power or energy, a control method and a control system are known which control the rate of increase in the flow rate of the hydraulic pump or the displacement velocity of the movable member, to keep the discharge pressure of the pump at a level below a predetermined pressure which does not exceed the pressure at which each of the relief valves is set. Some disadvantages are associated with this control method and control system. For example, when the hydraulic pump is actuated to act as a brake or when the flow rate of the hydraulic pump is reduced, it is impossible to control the displacement velocity of the movable member, so that prevention of an inordinate rise in the pressure on the suction side of the pump has to relay on the operation of the relief valves. This makes it impossible to recover energy of a hydraulic fluid of high pressure.

SUMMARY OF THE INVENTION

Accordingly an object of this invention is to provide a control method and a control system for a hydrostatic drive system operative to control the rate of change in the flow rate of a hydraulic pump in a manner to keep the discharge pressure and the suction pressure below predetermined values which are determined with respect to its flow rate not only when the flow rate of the pump increases but also when it decreases, so as to enable a loss of power to be avoided and a recovery of energy of high pressure fluid to be achieved by abstaining from using the relief valves.

According to the invention, there is provided a control method for a hydrostatic drive system including a variable displacement hydraulic pump and a hydraulic actuator connected together to provide a closed hydraulic fluid circuit, wherein a target value for the flow rate of the variable displacement hydraulic pump is set and control of the pump is effected to bring the flow rate of the pump to the target value level. The control method comprises the steps of sensing the current flow rate of the hydraulic pump, the current discharge pressure of the pump and the current suction pressure thereof, and controlling the rate of change in the flow rate of the hydraulic pump in such a manner that the discharge pressure does not exceed a first set of preset values with respect to the flow rate of the pump when the target value lies in a direction in which the flow rate of the pump is increased and the suction pressure does not exceed a second set of preset values with respect to the flow rate of the pump when the target value lies in a direction in which the flow rate of the pump is decreased.

According to the invention, there is also provided a control system for a hydrostatic drive system including a variable displacement hydraulic pump having a movable member for determining the displacement of said pump in accordance with the position of the movable member and a hydraulic actuator connected to the pump to provide a closed hydraulic fluid circuit. The control system comprises manipulating means operatively connected to said movable member of the variable displacement hydraulic pump, means for setting a target value for the flow rate of the variable displacement hydraulic pump, and a control means for feeding a manipulation signal into the manipulating means until the actual flow rate of the variable displacement hydraulic pump coincides with the target value. The control means comprises means for having the discharge pressure of and the flow rate of the pump inputted thereto when the target value lies in a direction in which the flow rate of the hydraulic pump is increased, and for controlling the manipulation signal in a manner to prevent the discharge pressure from exceeding a first set of preset values with respect to the flow rate of the pump, and means for having the suction pressure of and the flow rate of the hydraulic pump inputted thereto when the target value lies in a direction in which the flow rate of the pump is decreased, and for controlling the manipulation signal in a manner to prevent the suction pressure from exceeding a second set of preset values with respect to the flow rate of the pump.

DETAILED DESCRIPTION OF THE PREFERRED EMBODIMENTS

Figure 1:
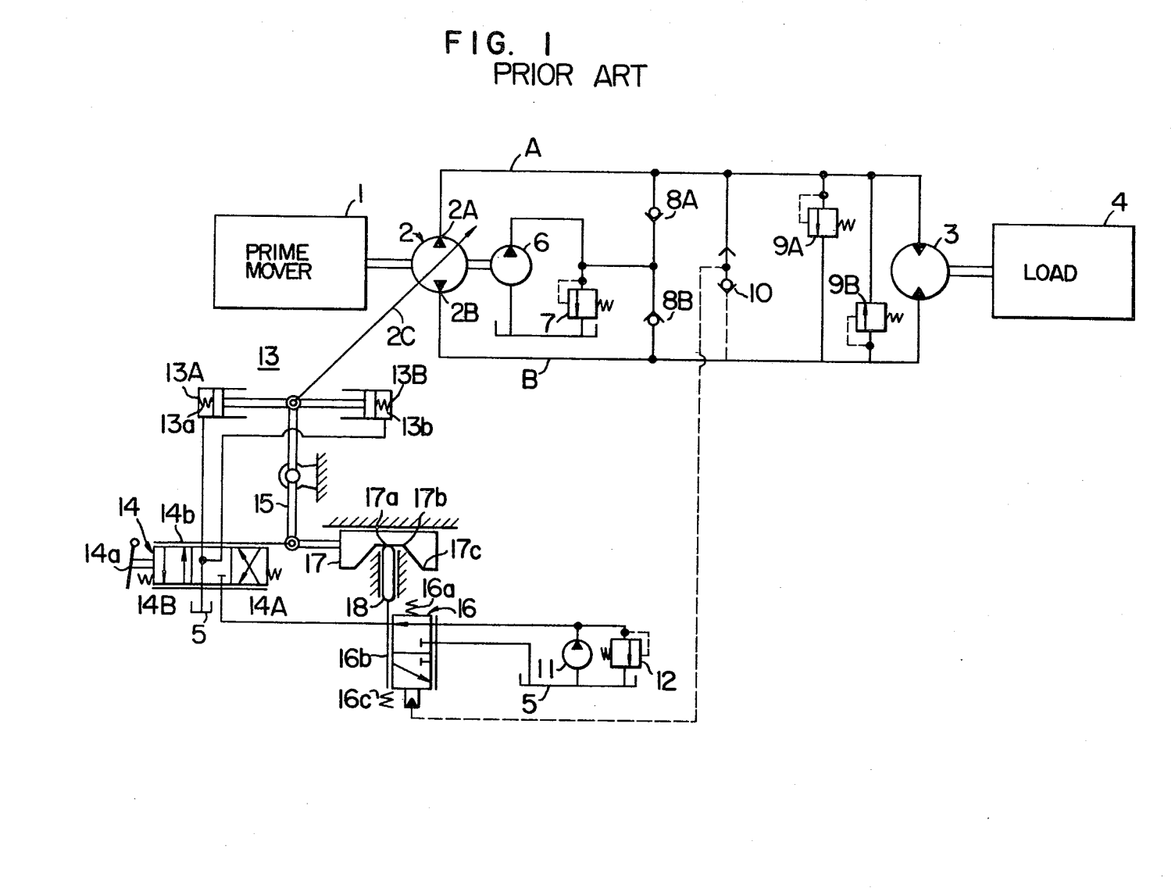
FIG. 1 is a circuit diagram showing one example of a hydrostatic drive system which has a control system of the prior art incorporated therein.

Referring now to the drawings wherein like reference numerals are used throughout the various views to designate like parts and, more particularly, to FIG. 1, according to this FIGURE a prime mover 1 is connected to a variable displacement hydraulic pump generally designated by the reference numeral 2 driven by the prime mover 1. A hydraulic actuator 3 is connected to the pump 2 through conduits A and B. The variable displacement hydraulic pump 2 has two ports 2A and 2B and is of the type capable of reversing the direction in which the fluid is delivered by the pump 2. The pump 2 may, for example, be a swash plate type or a swash shaft type axial plunger pump. The hydraulic pump 2 comprises a movable member 2c for determining the displacement of the pump, which may, for example, be a swash plate or a swash shaft, and provides a flow rate of the pump 2 which may vary depending on a displacement or an angle of inclination (hereinafter referred to as a tilt) with respect to a neutral position of the movable member 2c. A load 4 is connected to the hydraulic actuator 3. A tank 5 accommodating a hydraulic fluid, and a charge pump 6 driven by the prime mover 1, supplies pressurized fluid for avoiding the occurrence of a cavitation in the conduits A and B. A relief valve 7 sets a maximum discharge pressure for the charge pump 6. Check valves 8A and 8B are mounted in conduits connecting the charge pump 6 to the conduits A and B, respectively. Relief valves 9A and 9B set maximum pressures for the conduits A and B, respectively. A shuttle valve 10 selects the higher one of the pressures in the conduits A and B. A pilot pump 11 supplies pressurized fluid for controlling the tilt of the pump 2. A cylinder 13 for manipulating the movable member 2c of the pump 2 has pressure receiving chambers 13A and 13B in which springs 13a and 13b are respectively mounted. A servo valve generally designated by the reference numeral 14 suitably switches a pressurized fluid supply conduit and a conduit communicating with the tank 5 between the two pressure receiving chambers 13A and 13B of the cylinder 13. The servo valve 14 has connected thereto a manipulating lever 14a which manipulates the servo valve 14 to give a tilt target value $X_L$ to the pump 2. The servo valve 14 includes a sleeve 14b which has its position relative to a spool of the servo valve 14 changed by a feedback signal. A feedback link 15, connected to a piston rod of the cylinder 13 and the sleeve 14b, transmits a displacement of the piston rod to the sleeve 14b. A generally designated change-over valve of the reference numeral 16 switches a supply conduit for the servo valve 14 between the pilot valve 11 and the tank 5 in accordance with the pressure from the shuttle valve 10. A spring 16a performs the function of returning the spool of the servo valve 14 to a neutral position by overcoming the force of the pressurized fluid from the shuttle valve 10. A sleeve 16b has its position relative to a spool of the change-over valve 16 changed by a feedback signal. A spring 16c applies an offset load to the sleeve 16b. A cam 17 is displaceable by the feedback link 15. A rod 18 is positioned against the cam 17 for causing the sleeve 16b to be displaced in accordance with the shape of the cam 17.

In the hydrostatic drive system shown in FIG. 1, the variable displacement hydraulic pump 2 driven by the prime mover 1, and the hydraulic actuator 3 actuator connected to the load 4, are connected together to provide a closed circuit, and the operation of the hydraulic actuator 3 is controlled by controlling the tilt of the pump 2.

In the system of this construction, control or pump tilt control is effected in the following manner. Assume that a positive load is applied, with the port 2A being on the discharge side. In other words, assume that the flow rate of the pump 2 is increased from zero to drive the load 4, with the port 2A being a discharge port, so that the discharge pressure at the port 2A will be increased. In this case, the manipulating lever 14a of the servo valve 14 is actuated to switch the servo valve 14 to a position 14A. This allows the pressurized fluid supplied from the pump 11 to flow into one pressure receiving chamber 13A of the cylinder 13 via the change-over valve 16 and servo valve 14. With the other pressure receiving chamber 13B communicating with the tank 5 through the servo valve 14, the piston of the cylinder 13 moves rightwardly to increase the tilt of the pump 2 in such a manner that the flow rate discharged from the port 2A increases. This increase in the tilt of the pump 2 is fed back by the feedback link 15 to the sleeve 14b of the servo valve 14 and the piston rod of the cylinder 13 stops moving when the tilt of the pump 2 has reached the manipulated variable of the manipulating lever 14a or the tilt target value $X_L$, so long as the change-over valve 16 is switched.

During this process, the discharge pressure on the port 2A side rises to drive the load 4 and is supplied to the change-over valve 16 through the shuttle valve 10. When this pressure overcomes the biasing force of the spring 16a, the change-over valve 16 is switched. This brings the two pressure receiving chambers 13A and 13B into communication with the tank 5, even if the servo valve 14 is in the position 14A. With the cylinder 13 in this condition, the piston and therefore the tilt of the pump 2 are urged toward the neutral position, due to the biasing forces of the springs 13a and 13b of the cylinder 13, so that the flow rate and discharged pressure are decreased. Thus, the discharge pressure is controlled in a manner to prevent it from exceeding a switching pressure Pc of the change-over valve 16 prevailing at this time. The switching pressure Pc is decided by the position of the sleeve 16b of the change-over valve 16 and the characteristic of the spring 16a.

In, for example, the mechanism including the feedback link 15, cam 17 and rod 18 as shown in FIG. 1, it is possible to decide the switching pressure Pc or the maximum value of the prevailing discharge pressure of the pump 2 in accordance with the tilt by feeding back a change in the tilt of the pump 2 to the sleeve 16b of the change-over valve 16, to thereby effect control of the force or torque necessary for driving the hydraulic pump 2. As can be clearly seen in FIG. 1, the control characteristic for the input of the hydraulic pump 2 can be set as desired by changing the shape of the cam 17, so as to obtain, for example, a constant input torque.

The switching pressure Pc of the change-over valve 16 shows a maximum set value $P_{CMAX}$ when the rod 18 is located at the bottom of a recess of the cam 17, as shown in FIG. 1. However, when the load driving pressure is higher than the switching pressure Pc of this maximum value, the tilt of the pump 2 continues to decrease toward the neutral position until finally it reaches a minimum value necessary for keeping the $P_{CMAX}$. Thus, by setting the set pressure of the relief valve 9a at a level higher than the $P_{CMAX}$, it is possible to avoid a loss of power or energy due to relieving.

Conversely, when the load is negative or it is desired to apply the brake to an inertial member, the suction pressure of the pump 2 will become higher than the discharge pressure thereof. When this is the case, the following operation is performed. Assume that the manipulating lever 14a of the servo valve 14 is kept in a predetermined position to control the tilt of the pump 2 to a given position in a direction in which the port 2A is on the discharge side, to thereby drive the load 4 at steadystate velocity. When manipulating lever 14a is returned from this condition to the neutral position, the servo valve 14 shifts to a position 14B to supply pressurized fluid to the pressure receiving chamber 13B of the cylinder 13 while the pressure receiving chamber 13A communicates with the tank 5, so that the piston of the cylinder 13 moves leftwardly and the tilt of the pump 2 is returned to the neutral position. At this time, the load 4 tries to continue to move at the same velocity by its own inertia, so that the hydraulic actuator 3 performs a pumping action to generate a pressure at the port 2B of the pump 2 which is on the suction side. When this suction pressure exceeds the switching pressure Pc of the change-over valve 16 which is determined in accordance with the pump tilt in the same manner as described hereinabove, the change-over valve 16 is actuated to cut off the supply of the pressurized fluid to the servo valve 14, so that the pressure receiving chambers 13A and 13B of the cylinder 13 both communicate with the tank 5. With the cylinder 13 in this condition, the piston and the tilt of the pump 2 still continue to move toward the neutral position by the biasing forces of the springs 13a and 13b of the cylinder 13, so that the pressure on the suction side will further rise until the relief valve 19 is opened. Thus, the tilt of the pump 2 returns to the neutral position while the pressurized fluid from the hydraulic actuator 3 is released from the relief valve 9B. That is, the brake is applied to the load 4 as its energy of inertia is consumed through the relief valve 9B. Thus, no power or energy is recovered.

When the manipulating lever 14a is actuated in a direction opposite the direction described hereinabove to bring the port 2B of the pump 2 to the discharge side, the system operates substantially as described hereinabove except for the fact that the suction direction and the discharge direction show a change. Therefore no detail description of the operation will be given.

Figure 2:
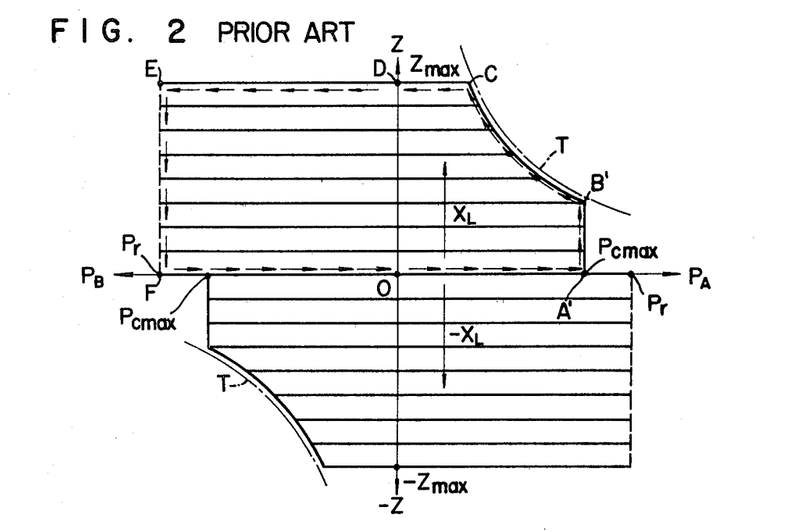
FIG. 2 is a graph showing a typical example of the characteristic of a control method of the prior art suitable for use in the hydrostatic drive system shown in FIG. 1.

FIG. 2 graphically depicts typical examples of the characteristics of pressures $P_A$ and $P_B$ in the conduits A and B and the tilt Z or the flow rate of the pump 2, with the lever manipulated variable or the tilt target value $X_L$ of the pump 2, being a parameter. In FIG. 2, a first quadrant and a third quadrant deal with a positive load having a higher discharge pressure than a suction pressure. By selecting a suitable shape for the cam 17 and a suitable biasing force for the spring 16a, it is possible to effect input control along a constant torque curve T. A second quadrant and a fourth quadrant deal with a negative load having a higher suction pressure than a discharge pressure, in which the maximum pressure is a relief valve set pressure $P_r$.

In FIG. 2, arrows shown in the first and second quadrants, as successively moving from the first quadrant to the second quadrant and then to the first quadrant represent operation points shown in chronological sequence of an operation in which a load of a very high inertia is driven, the manipulation lever 14a is operated from its neutral position or tilt target value $X_L = 0$ position to its maximum position or tilt target value $X_L = X_{LMAX}$ position, and the manipulation lever 14a is returned to the neutral position after the steadystate condition is reached in the maximum tilt position of the pump 2 or tilt $Z = Z_{MAX}$ position. Between points A' and B', the tilt gradually increases while the pressure on the discharge side is maintained at $P_{CMAX}$. During this period, the cam 17 moves leftwardly in FIG. 1 to bring a point 17a into contact with the rod 18. Then between B' and C, the tilt gradually increases until it reaches the maximum valve $Z_{MAX}$ while the discharge pressure gradually decreases. During this period, an inclined surface (between 17b and 17c) of the cam 17 is in engagement with the rod 18. Thereafter between C, D and E, the manipulation lever 14a is shown as being returned to the neutral position while the pump 2 is operating at the maximum tilt position, and, as the tilt shows a slight decrease, the pump 2 acts as a brake, causing the discharge pressure to be suddenly reduced while the suction pressure $P_B$ suddenly increases. As described above, an increase in suction pressure switches the change-over valve 16 to further decrease the tilt, so that the suction pressure suddenly rises to the set pressure Pr of the relief valve 9B, to bring about the condition shown in point E. Thereafter the relief valve 9B is opened to allow the pressurized fluid to pass through the relief valve 9B in its majority. Meanwhile the tilt of the pump 2 is reduced to zero. This condition is shown between E and F in FIG. 2. Thus, in the prior art, when the hydraulic pump 2 is caused to operate as a brake, it is impossible to control the rate of change in the tilt of the hydraulic pump 2, so that it becomes necessary to open the relief valve 9B to cause the high pressure oil to bypass the hydraulic pump 2. Because of this, the prior art has had the disadvantage that it is impossible to recover the energy possessed by the hydraulic fluid of high pressure at the hydraulic pump 2.

Figure 3:
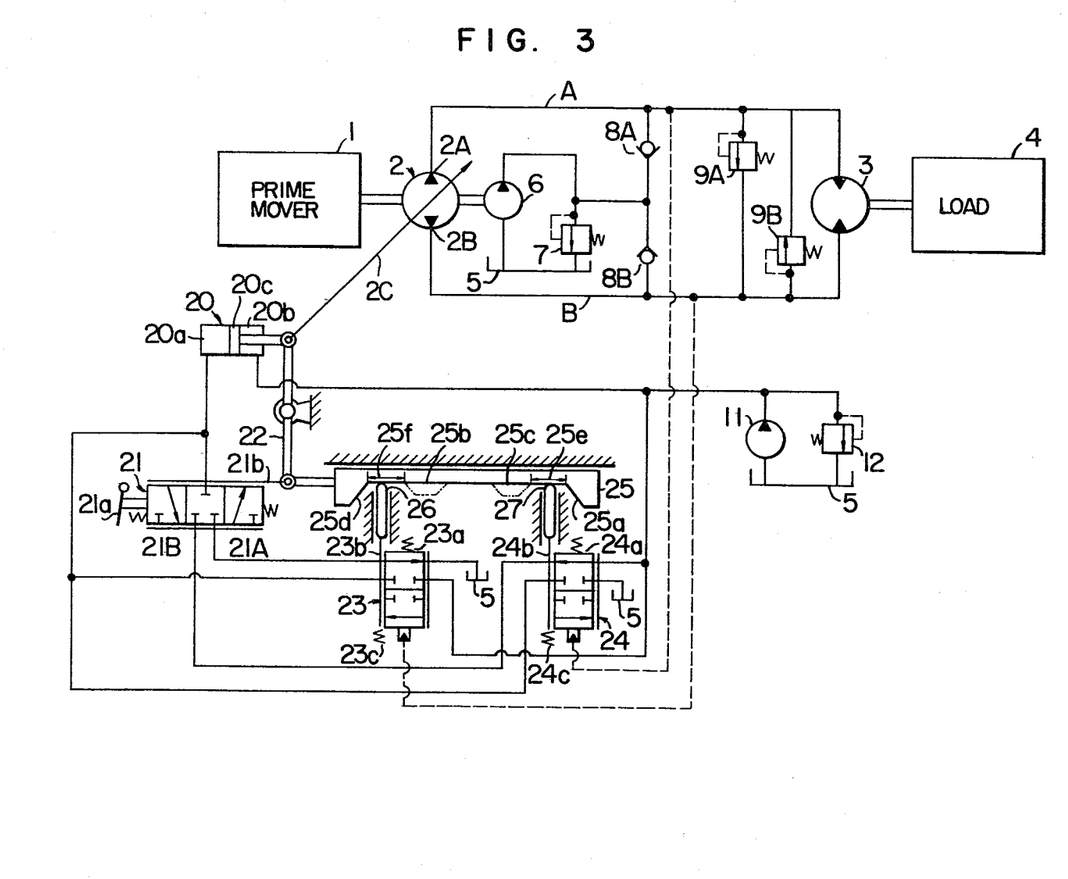
FIG. 3 is a circuit diagram showing a first example of a hydrostatic drive system with which the control system according to the invention is combined.

As shown in FIG. 3, a single-rod cylinder generally designated by the reference numeral 20 has a piston 20c connected to the movable member 2c for manipulating the tilt of the hydraulic pump 2. The cylinder 20 has a head side chamber 20a and a rod side chamber 20b into which is introduced the pressurized fluid from the pilot pump 11. A servo valve generally designated by the reference numeral 21 is adapted to be moved by a manipulating lever 21a as it is operated to actuate the cylinder 20. A sleeve 21b receives a feedback signal, with a feedback link 22 being connected at one end to a rod of the cylinder 20 and at the other end to the sleeve 21b, to feed back the tilt of the pump 2 to the servo valve 21. A change-over valve generally designated by the reference numeral 23 is mounted in a passageway from the servo valve 21 to the tank 5 and a passageway from the pilot pump 11 to the rod side chamber 20a of the cylinder 20, to be actuated by a pilot pressure from the conduit B. The changeover valve 23 includes a spool returning spring 23a, a sleeve 23b and a sleeve returning spring 23c. Another change-over valve generally designated by the reference numeral 24 is mounted in a passageway from the pump 11 to the servo motor 21 and a passageway from the head side chamber 20a of the cylinder 20 to the tank 5, to be actuated by a pilot pressure from the conduit A. The changeover valve 24 includes a spool returning spring 24a, a sleeve 24b, and a sleeve returning spring 24c. A cam 25 is connected to the feedback link 22, and rods 26, 27 are positioned against the cam 25. The sleeves 23b and 24b can be displaced in dependence upon the shape of the cam 25.

Control is effected in the hydrostatic drive system of the aforesaid construction as follows. First of all, control effected when the load 4 is positive and pressurized fluid is discharged through the port 2A of the pump 2 will be described. That is, when the manipulating lever 21a is switched to a position 21A in the condition in which the load 4 is stationary, the pressurized oil supplied from the pump 11 via the change-over valve 24 flows into the head side chamber 20a of the cylinder 20. The head side chamber 20a and the rod side chamber 20b being brought to the same pressure, the difference in area between the opposite sides of the piston 20c moves the piston 20c rightwardly to thereby increase the tilt of the pump 2 and discharge the pressurized fluid through the port 2A. The discharged fluid actuates the hydraulic actuator 3 to drive the load 4. Meanwhile this increase in the pump tilt is fed back to the sleeve 21b through the feedback link 22, so that the pump tilt increases to a value commensurate with the manipulated variable achieved by the manipulating lever 21a. During this process, discharge pressure is increased in the conduit A on the discharge side, and this pressure is introduced into the change-over valve 24 as a switching and pilot pressure. When this pressure reaches the switching pressure Pc, determined by the characteristic of the spring 24a and the position of the sleeve 24b or the shape of the cam 25, the change-over valve 24 is switched. At this time, even if the servo valve 21 is in position 21A, the passageway through which the pressurized fluid from the pump 11 is supplied is blocked by the change-over valve 24 and the passageway from the head side chamber 20a communicates with the tank 5, so that the piston 20c of the cylinder 20 is moved leftwardly by the pressurized fluid in the rod side chamber 20b, to thereby return the tilt of the pump 2 toward neutral. Thus, as is the case with the control described hereinabove, the rate of increase in the tilt is controlled so that the switching pressure Pc may not be exceeded by the discharge pressure. The discharge pressure is decided by the shape of the cam 25 to which the rod 27 is brought into contact. While a planar portion of the cam 25 is in contact with the rod 27, the discharge pressure is kept at the switching pressure $P_{CMAX}$. While an inclined portion 25a of the cam 25 is in contact with the rod 27, the discharge pressure is controlled as indicated by a curve B'-C in FIG. 4.

The case in which the load 4 is negative will now be described. Assume that the port 2A functions as a discharge port and the load 4 is driven at a steadystate velocity. At this time, the rod 26 of the change-over valve 23 is in contact with the planar portion 25a of the cam 25. The manipulating lever 21a is returned and brought to a position 21B. The head side chamber 20a of the cylinder 20 communicates with the tank 5 via the servo valve 21 and the change-over valve 23. Thus, the piston 20c of the cylinder 20 moves to the left to return the tilt of the pump toward neutral and causes the flow rate of the pump 2 to decrease. This causes a high pressure to be immediately generated in the conduit B on the suction side. When this pressure reaches the switching pressure Pc which is decided by the characteristic of the spring 23a of the change-over valve 23 and the position of the sleeve 23b or the shape of the cam 25, the change-over valve 23 is switched. Even if the servo valve 21 is in the position 21B, the passageway from the head side chamber 20a to the tank 5 is blocked by the change-over valve 23 and the head side chamber 20a is communicated with the pressurized oil supply passageway from the pump 11. Thus, by the difference in the area of the pressure receiving surface between opposite sides of the piston 20c, the piston of the cylinder 20 moves to the right to increase the pump tilt. Thus, the suction pressure decreases and after all the velocity of movement of the piston rod of the cylinder 20 or the rate of change in the tilt is controlled in such a manner that the switching pressure Pc is not exceeded by the suction pressure.

The aforesaid description refers to the condition in which the port 2A of the hydraulic pump 2 functions as a discharge port. The operation shows no change from what has been described when the port 2B functions as a discharge port. However, when the port 2B functions as a discharge port, the rate of increase in the tilt of the pump 2 effected when the flow rate of the pump 2 is increased is controlled by means of the change-over valve 23. At this time, the discharge pressure-flow rate characteristic is decided by a planar portion 25f and an inclined portion 25d of the cam 25. Meanwhile the rate of decrease in the flow rate of the pump 2 is determined by the change-over valve 24 when the flow rate of the pump 2 is reduced, and at this time the suction pressure-flow rate characteristic is decided by a planar portion 25e and a portion 25c adjacent thereto of the cam 25. In this embodiment, the portion 25c is formed to be planar, so that the suction pressure is controlled to be a constant pressure $P_{CMAX}$, regardless of the value of the flow rate of the delivery by the pump 2.

Figure 4:
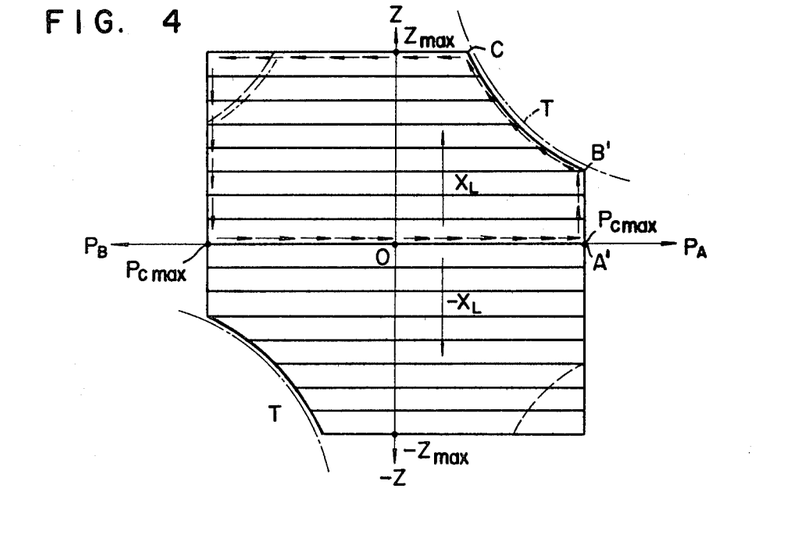
FIG. 4 is a graph showing one example of the characteristic of the control method according to the invention suitable for use with the hydrostatic drive system shown in FIG. 3.
Figure 5:
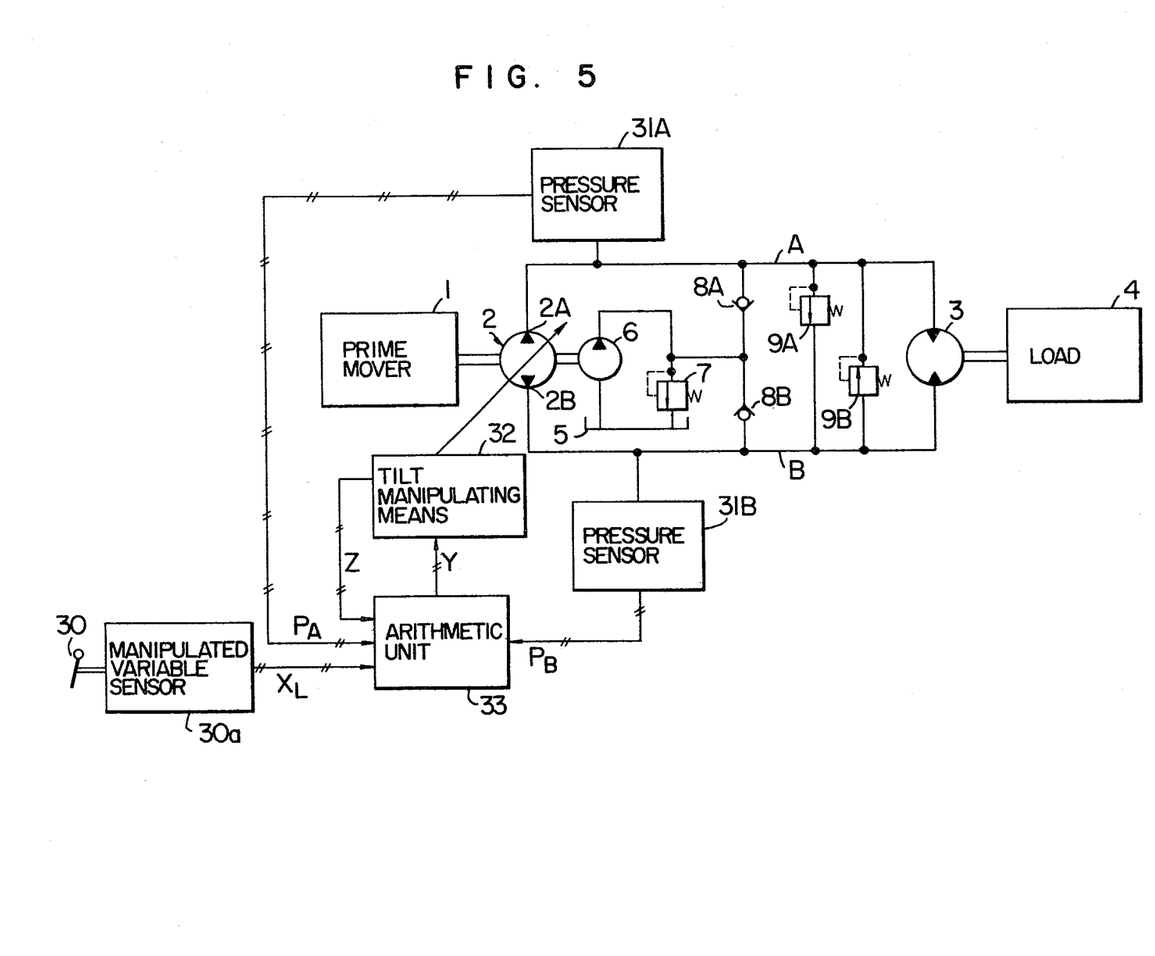
FIG. 5 is a circuit diagram showing a second example of a hydrostatic drive system with which the control system according to the invention is combined.

FIG. 4 graphically depicts the control characteristic described hereinabove. In a first quadrant and a third quadrant in which the load 4 is positive, the maximum pressure is $P_{CMAX}$ and the maximum value of the discharge pressure is controlled along a constant torque curve T as the pump tilt increases. In a second quadrant and a fourth quadrant in which the load 4 is negative, the suction pressure has a maximum value of $P_{CMAX}$ regardless of the pump tilt. When this characteristic is compared with that of the prior art shown in FIG. 2, it is found that the control is effected in the same manner in the case of a positive load, but that in the case of a negative load the suction pressure is controlled to the level of $P_{CMAX}$ without actuating the relief valves in the invention, enabling to avoid a loss of energy caused by the release of the fluid of high pressure. By selecting suitable shapes for the portions 26b and 25c of the cam 25 adapted to engage a change-over valve actuated by the suction pressure, such as the ones shown in dash-and-dot lines in FIG. 3, it is possible to carry out torque limitations in the case of a negative load by a characteristic different from that in the case of a positive load, as shown in broken lines in FIG. 4. As shown in FIG. 5, is a manipulating lever 30 which gives the tilt target value $X_L$ to the pump 2, and a manipulated variable sensor 30a senses the manipulated variable achieved by the manipulating lever 30 and supplies a tilt target value signal $X_L$. Pressure sensors for sense the pressures in the conduits A and B and supply pressure signals $P_A$ and $P_B$ respectively. A tilt manipulating means 32 manipulates the tilt of the pump 2 in accordance with a tilt manipulation command signal Y subsequently to be described, and senses the tilt of the pump 2 to supply a tilt signal Z. An arithmetic unit 33 is connected the manipulated variable sensor 30a, pressure sensors 31A, 31B and tilt manipulating means 32 and is fed with the tilt target signal $X_L$, tilt signal Z, pressure signal $P_A$ and pressure signal $P_B$. The arithmetic unit 33 produces a tilt manipulation command signal Y and feeds same into the tilt manipulating means 32.

In the hydrostatic drive system of the aforesaid construction, control is carried out as follows. Actuation of the manipulating lever 30 causes a tilt target signal $X_L$ to be fed from the manipulation sensor 30a to the arithmetic unit 33. The arithmetic unit 33 calculates a required pump tilt command signal X based on the signals $X_L$, Z, $P_A$, $P_B$ fed thereto and supplies a tilt command signal $Y = X - Z$ to the tilt manipulating means 32 which manipulates the tilt of the pump 2 in accordance with the manipulation command signal Y.

Figure 7:
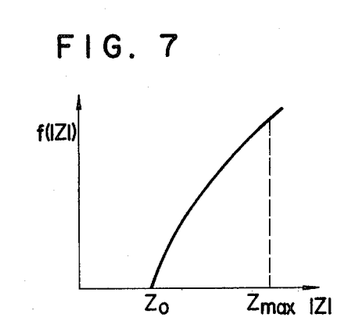
FIGS. 7, 8 and 9 are characteristic diagrams showing the functional relationships at which the microcomputer is preset for performing the operation process shown in the flow chart in FIG. 6.
Figure 8:
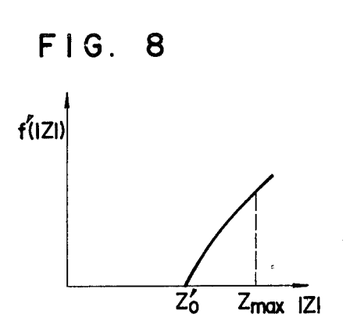
Figure 9:
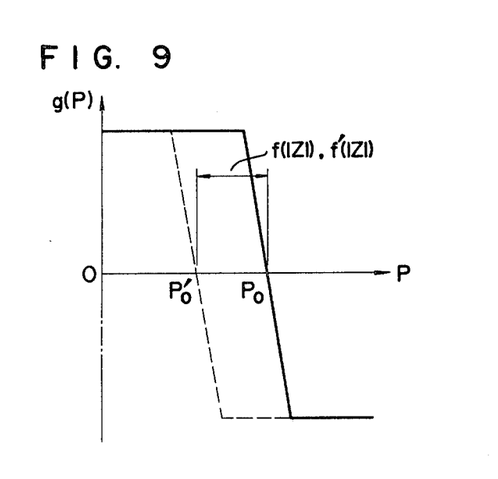

The processing of the signals carried out in effecting control according to the control method of the invention will be described by referring to FIG. 6 which is a flow chart indicating the steps to be followed in chronological sequence and FIGS. 7-9 which are characteristic diagrams showing functional relations previously set. The arithmetic unit 33 is a microcomputer, and in the interest of clarity the description will first refer to a case in which steps 58, 59, 60 and 61 shown in FIG. 6 are eliminated.

Figure 6:
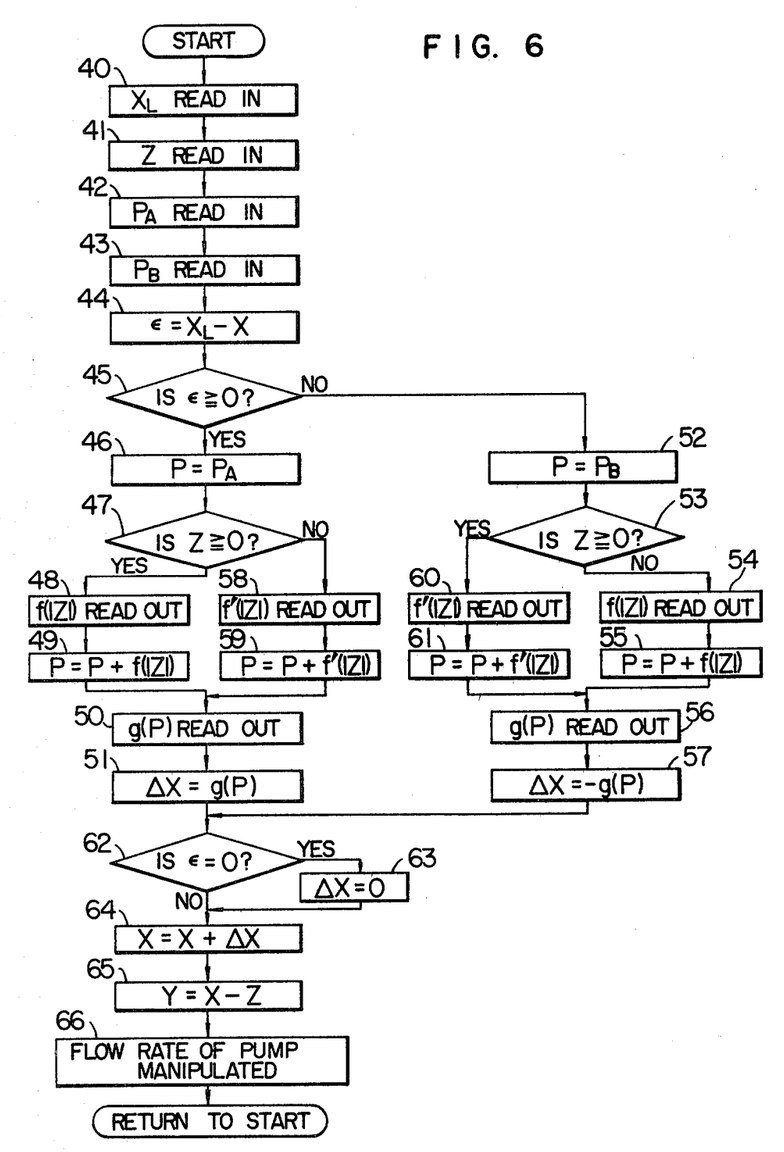
FIG. 6 is a flow chart of the operation process that is followed when a microcomputer is used as one example of the arithmetic unit of the control system for the hydrostatic drive system shown in FIG. 5.

Referring to FIG. 6, the tilt target $X_L$, tilt Z and pressures $P_A$ and $P_B$ are read into the arithmetic unit 33 in steps 40, 41, 42 and 43. In determining the tilt target $X_L$, tilt command X and tilt Z, the neutral position of the pump 2 shown in FIG. 5 is set at 0, the direction of a tilt in which the port 2A is placed on the discharge side is positive and the direction of a tilt in which the port 2B is placed on the discharge side is negative, for the convenience of description. In step 44, the difference between the tilt target $X_L$ and a tilt command X issued in the proceding cycle or $\epsilon = X_L - X$ is obtained, and in step 45, $\epsilon$ is judged whether positive or negative. When $\epsilon$ is positive, the process transfers to step 46 in which the value of the pressure $P_A$ in the conduit A is adopted as P. Then in step 47, whether the tilt Z is positive or negative or the discharge direction of the pump 2 is judged. If the tilt Z is negative, since $\epsilon \geq 0$, this condition shows that the load is negative and the flow rate of the delivery by the pump 2 through the port 2B should be reduced to control the load 4. In this case, the process transfers to step 50 (assuming that steps 58 and 59 do not exist), and a preset function g(P), to be described hereinbelow, is read out and substituted for an increment $\Delta X$ of the tilt command $X_L$ in step 51. Then, in step 62, whether $\epsilon = 0$ is judged, and when $\epsilon \neq 0$, the increment $\Delta X$ is added to the X of the immediately preceding cycle to produce a fresh tilt command X by calculation. In step 65, a tilt manipulation command $Y = X - Z$ is calculated and the tilt manipulation command Y obtained in fed into the tilt manipulating means 32 in step 66. As shown in FIG. 9, the function g(P) referred to hereinabove is set such that it has a constant positive value when the pressure P is low and begins to decrease in value when the value of P reaches a certain level, until g(P) = 0 when P = Po. The value further continues to decrease toward the negative, and when the value of P exceeds a certain level, the function g(P) has a constant negative value. Thus, as the suction pressure $P_A (= P)$ becomes higher in steps 50, 51 and 64, the rate of increase in the tilt of the pump 2 is reduced because the increment $\Delta X$ for one processing loop is reduced, so that the rate of increase in the tilt becomes 0 when $P_A = P$. Conversely, when $P \geq P_o$, the tilt, that has been shifting toward the neutral position, begins to shift in the reverse direction or toward a maximum negative value. From the foregoing, it will be appreciated that, ideally, the maximum value $P_{AMAX}$ of the suction pressure $P_A$ is limited to Po (in actual practice, however, the maximum value may vary depending on the moment of inertia of the load and other factors and become lower than Po). The characteristic described above corresponds to $P_{CMAX} = P_o$ in the fourth quadrant.

Meanwhile if the result of the judgment in step 47 is $Z \geq 0$, then it is indicated that the condition is that of positive load requiring to increase the flow rate of the pump 2 through the port 2A to accelerate the load 4. When this is the case, the process transfers to step 48, and a preset function f(|Z|), to be described hereinbelow is read out and added to P in step 49, to produce a fresh P by calculation. Then processing is carried out in step 50 et seq. in the same manner as described hereinabove. The function f(|Z|) is set previously in such a manner that it is functionally related to Z as shown in FIG. 7. Thus, when $\epsilon \neq 0$ in step 64 or when the steps 48→49→50→51→62→64→65 are followed, the value of P is greater by f(|Z|) than the actual pressure $P_A (= P)$ in the conduit A when the increment $\Delta X = g(P)$ is read out. This is equivalent to altering the characteristic of the function g(P) in such a manner that, in the characteristic diagram shown in FIG. 9, the inclined portion is translated by an amount equal to f(|Z|) as shown by a broken line. Thus, when the discharge pressure $P_A$ becomes higher than $P'_o$, the increment $\Delta X$ becomes negative and the tilt Z of the pump 2 decreases toward the neutral position. Thus, the discharge pressure $P_A$ is limited to $P'_o$ in this case. Therefore the maximum value of the discharge pressure P is set by $P'_o = P_o - f(|Z|)$ in accordance with the prevailing tilt Z. This characteristic corresponds to the $P_{CMAX} = P_o$ in the first quadrant of FIG. 4 which shows the characteristic of controlling an input torque to be constant.

When the result of the judgment performed in step 45 is $\epsilon < 0$, the process shifts to step 52 in which processing for changing the pressure P to $P_B$ takes place. In step 53, whether the tilt Z is positive or negative is judged, and the process shifts to step 56 when $Z \geq 0$ (steps 60 and 61 being considered nonexisting). This indicates the condition of a negative load in which the port 2A is on the discharge side and it is required to brake the load by reducing the tilt Z of the pump 2 or reducing the flow rate of the pump 2 through the port 2A. Thus, in step 56, processing is carried out in such a manner that a function g(P) is read out to determine an increment $\Delta X$ based on the function g(P), in the same manner as described previously. At this time, the function g(P) has its sign changed and the increment $\Delta X$ is determined. Then after shifting to step 62, steps 64, 65 and 66 are successively followed if $\epsilon \neq 0$. When the suction pressure $P_B (= P)$ becomes higher than the Po in FIG. 9 as a result of the processing just performed, g(P) becomes negative. However, the increment $\Delta X$ becomes positive by the substitution $\Delta X = -g(P)$ carried out in step 57.

That is, the tilt Z of the pump 2 shifts in the direction in which the flow rate of the pump 2 through the port 2A increases. Thus, the maximum value of the suction pressure $P_B$ is limited to $P_o$. This characteristic corresponds to the characteristic of the second quadrant shown in FIG. 4.

When $Z<0$ in step 53, this indicates the condition of a positive load in which the load 4 is accelerated by shifting the tilt Z of the pump 2 in a direction in which the flow rate of the pump 2 through the port 2A increased or shift the tilt Z toward a maximum negative value. Thus, in step 54 the function $f(|Z|)$ is read out in the same manner as described by referring to steps 48 and 49 and calculation is carried out in step 55 to add $f(|Z|)$ to the pressure P to provide a fresh pressure P. Then in step 56, the function g(P) is read out in the same manner as described hereinabove. Thereafter steps 57, 62, 64, 65 and 66 are followed. When this series of operations raise the discharge pressure $P_B$ to a level higher than $P'_o = P_o - f(|Z|)$, the increment $\Delta X$ is positive and the tilt of the pump 2 shifts toward the neutral position to reduce the flow rate of the pump 2. Thus, the maximum value of the discharge pressure $P_B$ is limited to the $P'_o$ which is decided by the prevailing tilt Z. This characteristic corresponds to the characteristic of $P_{CMAX} = P_o$ in the third quadrant in FIG. 4.

In the series of operations described hereinabove, when $\epsilon = 0$, the process shifts from step 62 to step 63 in which the increment $\Delta X = 0$, so that the tilt Z of the pump 2 becomes constant in value.

In the foregoing description, steps 58, 59, 60 and 61 have been eliminated. However, by using steps 58 and 59 for reading out a function $f'(|Z|)$ set beforehand which is distinct from the function $f(|Z|)$ and steps 60 and 61 for adding the function $f'(|Z|)$ to P to produce a fresh pressure P, it would be possible to obtain, in the case of a negative load, a characteristic distinct from the characteristic obtained in the case of a positive load. For example, it would be readily possible to set the function $f'(|Z|)$ as shown in the characteristic diagram shown in FIG. 8 and carry out torque limitations as indicated by a broken line in FIG. 9.

The arrows in FIG. 4 or the arrows proceeding through first quadrant→second quadrant→first quadrant show changes with time occurring when the manipulating lever is given with $X_L = 0 \rightarrow X_{LMAX} \rightarrow 0$ in driving a load of a very high inertia, in the same manner as described by referring to FIG. 2.

From the foregoing description, it will be appreciated that the control method according to the invention for a hydrostatic drive system enables, when the flow rate of a variable displacement hydraulic pump forming a part of a closed hydraulic fluid circuit is increased, the rate of change in the tilt of the pump 2 or the flow rate of the pump 2 to be controlled in such a manner that the discharge pressure may not exceed a first set of preset values with respect to the flow rate of the pump 2. When the flow rate of the pump 2 is decreased, it enables the rate of change in the tilt of the pump 2 or the flow rate of the pump 2 to be controlled in such a manner that the suction pressure may not exceed a second set of preset values with respect to the flow rate of the pump 2. Thus, the invention makes it possible to avoid a loss of energy due to the pressurized fluid being relieved as in the prior art in the case of a positive load, to effect input limitations, and to effect torque limitations in the case of a negative load having a characteristic different from the characteristic obtained in the case of a positive load or to optimize the characteristic so that impact is minimized while a required braking distance and an efficient energy recovery can be achieved. It is also possible to do without torque limitations. In this case, the braking distance is shortened and the braking characteristic can be improved, thereby further increasing the energy recovery efficiency.

What is claimed is:

1. A control method for a hydrostatic drive system including a variable displacement hydraulic pump and a hydraulic actuator connected together to provide a closed hydraulic fluid circuit, wherein a target value for the flow rate of the variable displacement hydraulic pump is set and control of the pump is effected to bring the flow rate of the pump to the target value level, characterized in that said method comprises the steps of:

sensing a current flow rate of the hydraulic pump, a current discharge pressure of the pump and a current suction pressure thereof; and controlling a rate of change in the flow rate of the hydraulic pump in such a manner that the discharge pressure does not exceed a first set of preset values with respect to the flow rate of the pump when the target value lies in a direction in which the flow rate of the pump is increased and the suction pressure does not exceed a second set of preset values with respect to the flow rate of the pump when the target value lies in a direction in which the flow rate of the pump is decreased.

2. A control system for a hydrostatic drive system including a variable displacement hydraulic pump having a movable member for determining a displacement of said pump in accordance with a position of the movable member and a hydraulic actuator connected to the pump to provide a closed hydraulic fluid circuit, said control system comprising manipulating means operatively connected to said movable member of the variable displacement hydraulic pump; means for setting a target value for the flow rate of the variable displacement hydraulic pump; and a control means for feeding a manipulation signal into the manipulating means until an actual flow rate of the variable displacement hydraulic pump coincides with the target value, wherein said control means comprises:

means for having a discharge pressure of and the flow rate of the hydraulic pump inputted thereto when the target value lies in a direction in which the flow rate of the hydraulic pump is increased, and controlling the manipulation signal in a manner to prevent the discharge pressure from exceeding a first set of preset values with respect to the flow rate of the pump; and means for having a suction pressure of an the flow rate of the hydraulic pump inputted thereto when the target value lies in a direction in which the flow rate of the pump is decreased, and for controlling the manipulation signal in a manner to prevent the suction pressure from exceeding a second set of preset values with respect to the flow rate of the pump.

3. A control system as claimed in claim 2, wherein said manipulating means comprises a hydraulic piston-cylinder assembly comprising a piston connected to the movable member of the hydraulic pump, means for normally biasing said piston in one direction, and a hydraulic pressure acting chamber causing a hydraulic pressure to act on said piston in a direction opposite the direction in which the piston is normally biased, and wherein the manipulation signal from said control means is in the form of hydraulic fluid flowing into and out of said hydraulic pressure acting chamber.

4. A control system as claimed in claim 3, wherein said control means further comprises:
   a hydraulic pressure supply source,
   a servo valve interposed between the hydraulic pressure acting chamber of said hydraulic piston-cylinder assembly and the hydraulic pressure supply source, said servo valve including a sleeve and a spool movable relative to each other, one of said sleeve and said spool being connected to said means for setting a target value and the other of said sleeve and said spool being connected to said movable member to feed back the position of the movable member.
   first means for controlling the flow rate of the hydraulic fluid flowing into said hydraulic pressure acting chamber in accordance with the position of said movable member and the discharge pressure of said hydraulic pump, and
   second means for controlling the flow rate of the hydraulic fluid flowing out of said hydraulic pressure acting chamber in accordance with the position of said movable member and the suction pressure of said hydraulic pump.

5. A control system as claimed in claim 4, wherein said first means comprises a change-over valve mounted in a first passageway connecting said hydraulic pressure source to said servo valve and a second passageway connecting said hydraulic pressure acting chamber to a discharge tank, said change-over valve including a sleeve and a spool movable relative to each other, spring means biasing said spool to a first position of said spool with respect to said sleeve in which position said first passageway is open and said second passageway is blocked, means for causing the discharge pressure of said hydraulic pump to act on one end surface of said spool to bias same in a direction opposite the direction in which said spool is biased by said spring means, and resilience adjusting means for adjusting a resilience of said spring means in accordance with the position of said movable member, and
   wherein said second means comprises a change-over valve mounted in a third passageway connecting said hydraulic pressure supply source to said hydraulic pressure acting chamber and a fourth passageway connecting said servo valve to said discharge tank, said change-over valve including a sleeve and a spool movable relative to each other, spring means biasing said spool to a first position of said spool with respect to said sleeve in which position said fourth passageway is open and said third passageway is closed, means for causing the suction pressure of said hydraulic pump to act on one end surface of said spool to bias same in a direction opposite the direction in which said spool is biased by said spring means, and resilience adjusting means for adjusting the resilience of said spring means in accordance with a position of said movable member.

6. A control system as claimed in claim 5, wherein said resilience adjusting means of said first means and said second means comprise a common single cam adapted to move the sleeve of each of the change-over valves, said cam being connected to said movable member.

7. A control system as claimed in claim 3, wherein said variable displacement pump comprises a first port and a second port and is capable of reversing a direction in which the delivery by the pump is discharged and wherein said control means further comprises
   a hydraulic pressure supply source,
   a servo valve interposed between the hydraulic pressure acting chamber of said hydraulic piston-cylinder assembly, said servo valve including a sleeve and a spool movable relative to each other, one of said sleeve and spool being connected to said means for setting a target value and the other of said sleeve and said spool being connected to said movable member to feed back the position of said movable member,
   a first change-over valve mounted in a first passageway connecting said hydraulic pressure supply source to said servo valve and a second passageway connecting said hydraulic pressure acting chamber to a discharge tank, said first change-over valve including a sleeve and a spool movable relative to each other,
   first spring means for biasing said spool of said first change-over valve to a first position of said spool with respect to said sleeve in which position said first passageway is open and said second passageway is blocked,
   means for causing the pressure of the fluid in the first port of said hydraulic pump to act on one end surface of said spool of said first change-over valve, said spool being moved to a second position in which position said first passageway is blocked and said second passageway is open when said hydraulic pressure exerts a force ovecoming the force exerted by said first spring means,
   first resilience adjusting means for adjusting a resilience of said first spring means in accordance with the position of said movable member,
   a second change-over valve mounted in a third passageway connecting said hydraulic pressure supply source to said hydraulic pressure acting chamber and a fourth passageway connecting said servo valve to a discharge tank, said second change-over valve including a sleeve and a spool movable relative to each other,
   second spring means for biasing said spool of said second change-over valve to a first position of said spool with respect to said sleeve in which position said fourth passageway is open and said third passageway is blocked,
   means for causing the fluid pressure on the second port side of said hydraulic pump to act on one end surface of said spool of said second change-over valve, said spool being moved to a second position in which position said third passageway is open and said fourth passageway is blocked when said hydraulic pressure exerts a force overcoming the force exerted by said second spring means, and
   second resilience adjusting means for adjusting a resilience of said second spring means in accordance with the position of said movable member.

8. A control system as claimed in claim 7, wherein said first resilience adjusting means and said second resilience adjusting means comprise a single common cam adapted to move the spools of said first change-over valve and said second change-over valve, said cam being connected to said movable member and having a first cam surface acting on said first change-over valve and a second cam surface acting on said second change-over valve when the first port of said hydraulic pump is placed on the discharge side and having a third cam surface acting on said first change-over valve and a fourth cam surface acting on said second change-over valve when said first port of said hydraulic pump is placed on the suction side, said first cam surface and said fourth cam surface being of the same characteristic and said second cam surface and said third cam surface being of the same characteristic.

9. A control system as claimed in claim 2, wherein said control means further comprises:
   means combined with said means for setting a target value for the flow rate of the pump to supply as its output a target value signal corresponding to the target value for the flow rate of the delivery,
   means for supplying a flow rate output signal indicating the current flow rate of the pump,
   means for supplying a discharge pressure output signal indicating the discharge pressure of said pump,
   means for supplying a suction pressure output signal indicating the suction pressure of said pump, and
   an arithmetic unit inputting said target value output signal, said flow rate output signal, said discharge pressure output signal, and said suction pressure output signal and calculating said manipulating signal based on these inputted output signals and supplying the same as an output signal,
   said arithmetic unit comprising means for judging whether a difference between the target value output signal and a previous command signal for the flow rate of the pump is positive or negative, means for calculating, when said difference is positive, a command signal for an increment of the flow rate of the pump by using the discharge pressure and a first function, means for calculating, when said difference is negative, a command signal for an increment of the flow rate of the pump by using the suction pressure and a second function means for calculating a fresh command signal for the flow rate of the pump based on said increment command signal and a command signal for the flow rate of the pump issued in the preceding operation, and means for calculating a manipulation signal based on said fresh command signal for the flow rate of the pump and said flow rate signal.

10. A control system as claimed in claim 2, wherein said variable displacement hydraulic pump is of the type capable of reversing a direction of the flow of the delivery, and wherein said control means further comprises:
    means combined with said means for setting a target value for the flow rate of the pump and supplying as a target value output signal corresponding to the target value for the flow rate of the pump,
    means for supplying a flow rate output signal indicating the current flow rate of the pump,
    means for supplying a first pressure output signal indicating the pressure in one port of the hydraulic pump,
    means for supplying as a second pressure output signal indicating the pressure in the other port of the hydraulic pump, and
    an arithmetic unit inputting said target value output signal, said flow rate output signal, said first pressure output signal and said second pressure output signal and calculating said manipulation signal based on these inputted output signals and supplying the same as an output signal,
    said arithmetic unit comprising means for judging whether the difference between the target value output signal and a preceding command signal for the flow rate of the pump is positive or negative, means for selecting the first pressure signal as pressure signal when the difference is positive, means for judging whether said flow rate output signal is positive or negative, means for calculating, when said flow rate output signal is positive, an increment command signal for the flow rate of the pump based on said first pressure signal and a first function, means for calculating, when said flow rate output signal is negative, an increment command signal for the flow rate of the pump based on the second pressure signal and a second function, means for selecting, when said difference is negative, the second pressure signal as pressure signal, means for judging whether said flow rate output signal is positive or negative, means for calculating, when said flow rate output signal is positive, an increment command signal for the flow rate of the pump based on the second pressure signal and said second function, means for calculating, when said flow rate output signal is negative, an increment command signal for the flow rate of the pump based on said second pressure signal and said first function, means for calculating a fresh command signal for the flow rate of the pump based on said increment command signal and a command signal for the flow rate of the pump issued in the preceding operation, and means for calculating a manipulation signal from said fresh command signal for the flow rate of the pump and said flow rate output signal.

* * * * *